(12) United States Patent
Heres et al.

(10) Patent No.: US 8,557,120 B2
(45) Date of Patent: Oct. 15, 2013

(54) GROUPED SEPARATION OF ACTINIDES FROM A STRONGLY ACIDIC AQUEOUS PHASE

(75) Inventors: Xavier Heres, Avignon (FR); Manuel Miguirditchian, Avignon (FR); Pascal Baron, Bagnols sur Ceze (FR); Laurence Chareyre, St Just (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 12/297,651

(22) PCT Filed: Apr. 19, 2007

(86) PCT No.: PCT/EP2007/053849
§ 371 (c)(1),
(2), (4) Date: Oct. 20, 2008

(87) PCT Pub. No.: WO2007/118904
PCT Pub. Date: Oct. 25, 2007

(65) Prior Publication Data
US 2009/0184051 A1     Jul. 23, 2009

(30) Foreign Application Priority Data
Apr. 19, 2006 (FR) ................................. 06 51376

(51) Int. Cl.
*B01D 59/24* (2006.01)
*B01D 17/00* (2006.01)

(52) U.S. Cl.
USPC ............ 210/638; 210/634; 210/643; 423/8; 423/20; 423/658.5

(58) Field of Classification Search
USPC .............................................. 423/4; 210/638
See application file for complete search history.

(56) References Cited

U.S. PATENT DOCUMENTS

| 4,011,296 | A | * | 3/1977 | Ruiz et al. ..................... 423/4 |
| 7,157,003 | B2 | | 1/2007 | Baron et al. |
| 2005/0288542 | A1 | * | 12/2005 | Grandjean et al. ......... 588/313 |

FOREIGN PATENT DOCUMENTS

FR      2 845 616      4/2004

OTHER PUBLICATIONS

P. Baron, et al., "Separation of the Minor Actinides: The Diamex-Sanex Concept", Proceedings of the International Conference on Back-End of the Fuel Cycle: From Research to Solutions Global'01, INIS-FR-1108, Sep. 2001, pp. 1-8.

* cited by examiner

*Primary Examiner* — Krishnan S Menon
*Assistant Examiner* — Allison M Gionta
(74) *Attorney, Agent, or Firm* — Oblon, Spivak, McClelland, Maier & Neustadt, L.L.P.

(57) ABSTRACT

The invention relates to a process for collectively separating all the actinides (III), (IV), (V) and (VI) present in a strongly acidic aqueous phase, from the fission products, and in particular from the lanthanides, which are also present in this phase, using two extractants that operate in unconnected chemical fields.

Applications: reprocessing of irradiated nuclear fuels, especially to recover plutonium, neptunium, americium, curium and, possibly, uranium present in trace amounts, in a grouped manner but selectively with respect to the lanthanides, from a solution for dissolution of an irradiated nuclear fuel, downstream of a uranium extraction cycle.

12 Claims, 1 Drawing Sheet

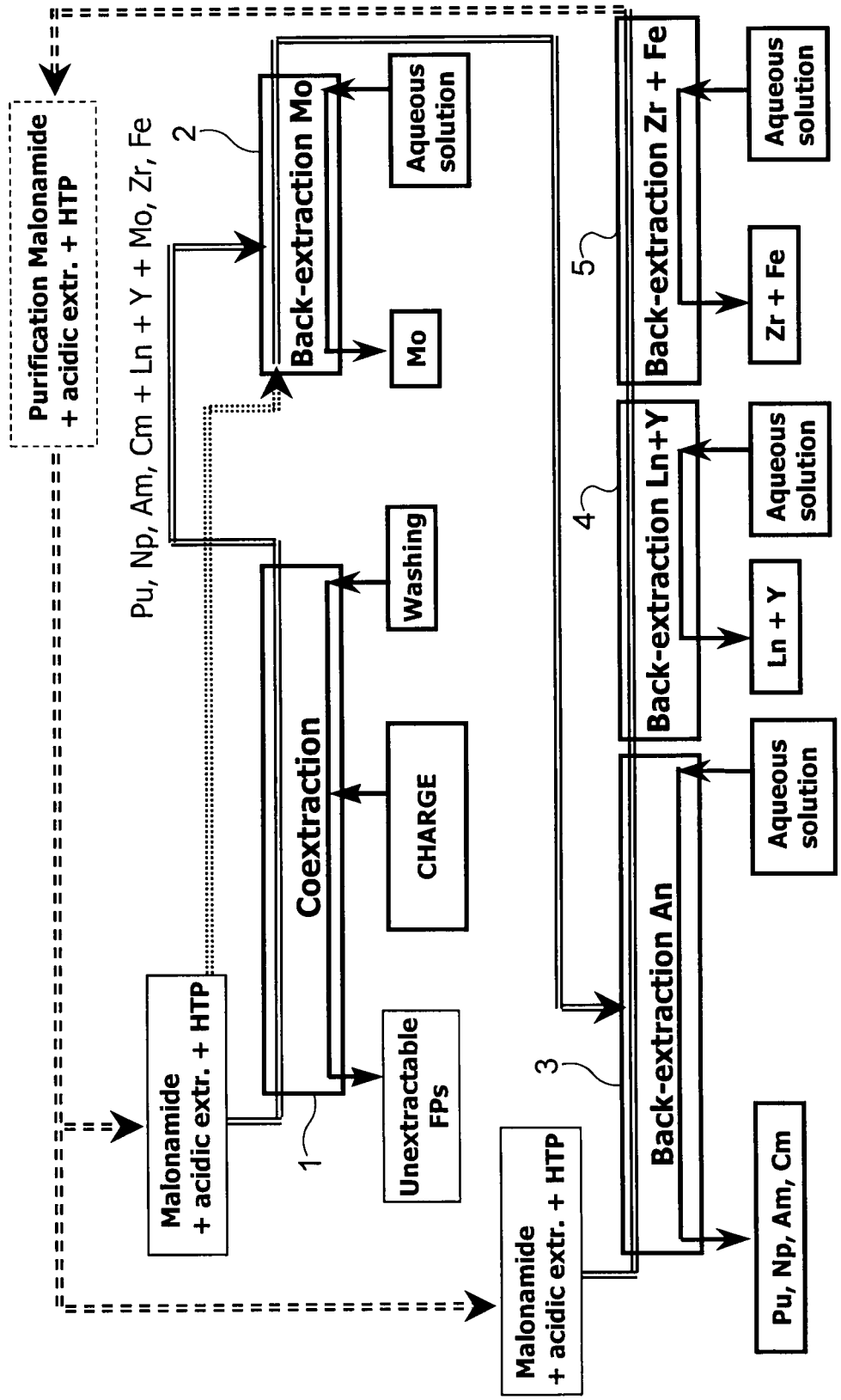

GROUPED SEPARATION OF ACTINIDES FROM A STRONGLY ACIDIC AQUEOUS PHASE

TECHNICAL FIELD

The present invention relates to a process for collectively separating all the actinides (III), (IV), (V) and (VI) present in a strongly acidic aqueous phase from the fission products, and in particular the lanthanides, also present in this phase, using two extractants that operate in unconnected chemical fields.

This process may be used in the field of reprocessing irradiated nuclear fuels, especially to recover plutonium, neptunium, americium, curium and possibly uranium, in a grouped manner but selectively with respect to the fission products, from a solution for dissolution of an irradiated nuclear fuel, downstream of a uranium extraction cycle.

PRIOR ART

The strategy for reprocessing irradiated nuclear fuels, as currently applied in France, is based on the PUREX process for separating uranium and plutonium, not only from the other chemical elements present in these fuels, but also from each other, and for purifying them.

For the purpose of performing a rigorous separation of long-lived radionucleides, it has been proposed, firstly, to modify the PUREX process so that it can also isolate neptunium, and, secondly, to place downstream of the PUREX process processes for separating americium, curium and lanthanides from the rest of the fission products, and then the americium and curium from the lanthanides, and finally the americium from the curium.

To separate the americium and curium (which are in oxidation state III in the raffinates obtained from the PUREX process) from the lanthanides (which are also in the trivalent state in these raffinates), a process has been proposed based on the use of two extractants operating in unconnected chemical fields, namely: a first extractant, of malonamide type, which is capable of collectively extracting the actinides (III) and lanthanides (III) from an aqueous phase with strong nitric acidity, and a second extractant, of acidic type, which is capable of extracting the actinides (III) and lanthanides (III) from an aqueous phase with weak nitric acidity (Baron P. et al., *Proceedings of the International Conference on Back-End of the Fuel Cycle: From Research to solutions GLOBAL '01*, Paris, France, 9-13 Sep. 2001, published by INIS-FR-1108, [1]). This process consists schematically in coextracting the actinides (III) and lanthanides (III) by making them migrate together from the raffinate to an organic solution, and then in successively back-extracting the actinides and lanthanides from this organic solution.

In order to limit the proliferation of plutonium, and in the perspective of a line manufacture of future nuclear fuels, it is currently sought to develop processes for recovering, from a solution for dissolution of an irradiated nuclear fuel that has been freed beforehand of its uranium, the plutonium, neptunium, americium and curium present in this solution, in a grouped manner but selectively with respect to the fission products.

The development of such processes should take into account a certain number of constraints, and in particular the fact that, firstly, the plutonium, neptunium, americium and curium are in different oxidation states in solution, ranging from oxidation state III for americium and curium to oxidation state VI for plutonium, neptunium and uranium, and that, secondly, a solution for dissolution of an irradiated nuclear fuel that has not been freed of its uranium has a very high total content of cations (of at least 0.1 mol/L) and in particular of plutonium.

Now, in the course of their studies, the Inventors have found that a process based on the use of two extractants operating in unconnected chemical fields—like the process proposed in the abovementioned reference for the separation of actinides (III) from lanthanides (III) where the constraints that have just been mentioned do not exist—can, surprisingly, allow a grouped but selective separation of all the actinides present in a solution for dissolution of an irradiated nuclear fuel.

The present invention is based on this finding.

DESCRIPTION OF THE INVENTION

One subject of the present invention is a process for the grouped separation of the actinides (III), (IV), (V) and (VI) present in a strongly acidic aqueous phase, also containing fission products including lanthanides, this process comprising the following steps:

a) coextraction of the actinides, the lanthanides, yttrium and possibly a few other fission products, from the strongly acidic aqueous phase by bringing this phase into contact with an immiscible organic phase, which contains a first extractant capable of extracting these elements from a strongly acidic aqueous phase and a second extractant capable of extracting these same elements from a weakly acidic aqueous phase; and b) selective back-extraction of the actinides from the organic phase by bringing this organic phase into contact with a weakly acidic aqueous phase containing at least one complexing agent.

In the text hereinabove and hereinbelow, the expressions "strongly acidic aqueous phase" and "weakly acidic aqueous phase" are taken in their usual accepted sense in the field of reprocessing irradiated nuclear fuels, namely that a strongly acidic aqueous phase generally has a pH of not more than 0, which corresponds, for example, to an aqueous nitric acid solution with a molarity at least equal to 1 M, whereas a weakly acidic aqueous phase generally has a pH strictly greater than 0, which corresponds, for example, to an aqueous nitric acid solution with a molarity strictly less than 1 M.

As mentioned previously, the organic phase used in the process according to the invention contains two different extractants:

a first extractant whose function is to allow the extraction of the actinides from the strongly acidic aqueous phase when, in step a), this aqueous phase is brought into contact with the organic phase, and insofar as this extraction is accompanied by that of the lanthanides and possibly that of a few other fission products such as molybdenum, zirconium, yttrium, ruthenium, palladium, strontium or iron, a second extractant whose role is to retain these lanthanides and these fission products in the organic phase when, in step b), the said phase is brought into contact with the weakly acidic aqueous phase, and thus to allow the selective aqueous complexation of the actinides.

In accordance with the invention, the first extractant is preferably a solvating extractant, whereas the second extractant is preferably a cation-exchange extractant, also known as an acidic extractant.

The solvating extractant may be chosen especially from:
malonamides such as N,N'-dimethyl-N,N'-dibutyltetradecylmalonamide or DMDBTDMA, N,N'-dimethyl-N,N'- dioctylhexylethoxymalonamide or DMDOHEMA and N,N'-dimethyl-N,N'-dibutyldodecylmalonamide or DMDBDDEMA, trialkylphosphine oxides such as trioctylphosphine oxide or TOPO and tributylphosphine oxide or TBPO, carbamoylphosphine oxides such as diisobutylphenyloctylcarbamoylmethylphosphine oxide or CMPO, triisobutylphosphine sulfides, carbamoylphosphonates, and mixtures thereof.

The cation-exchange extractant may itself be chosen especially from:

phosphorus-based acids such as monoalkyl- and dialkylphosphoric acids (for example bis(2-ethylhexyl)phosphoric acid or HDEHP, dihexylphosphoric acid or HDHP, bis(1,3-dimethylbutyl)phosphoric acid or HBD-MBP and diisodecylphosphoric acid or DIDPA), monoalkyl- and dialkylphosphonic acids (for example 2-ethylhexyl-ethylhexylphosphonic acid or HEHEHP), monoalkyl- and dialkylphosphinic acids, thiophosphoric acids, thiophosphonic acids, thiophosphinic acids and thiophosphorus acids, lipophilic carboxylic acids, sulfonic acids such as dinonylnaphthalenesulfonic acid or HDNNS, hydroxamic acids, substituted 8-hydroxyquinolines, β-diketones, β-hydroxyoximes, and mixtures thereof.

As regards the organic diluent, it may be chosen from any polar or aliphatic organic diluent whose use has been proposed for performing liquid-liquid extractions in the field of reprocessing irradiated nuclear fuels, such as toluene, xylene, t-butylbenzene, triisopropylbenzene, n-dodecane, hydrogenated tetrapropylene or HTP, or kerosene.

In the context of the present invention, it is most particularly preferred to use a malonamide, and in particular DMDOHEMA, as first extractant, and a phosphorus-based acid, and especially HDEHP or HEHEHP, as second extractant. The reason for this is that the Inventors have found, surprisingly, that the second extractant is then capable of acting as a phase modifier during step a) and of substantially raising the acidity value of the strongly acidic aqueous phase for which demixing (i.e. the appearance of a third phase following saturation with cations of the organic phase) is liable to take place and, thus, the charging capacity of the organic phase.

In step a), the coextraction of certain fission products, for instance palladium, and also that of other undesirable cations may advantageously be avoided or, at the very least, be limited, by adding at least one complexing agent to the strongly acidic aqueous phase. This complexing agent may be chosen especially from pyridinepolycarboxylic acids (for example 2,6-pyridinedicarboxylic acid), polyamino-carboxylic acids (for example N-(2-hydroxyethyl)-ethylenediaminetriacetic acid or HEDTA, and diethylenetriaminepentaacetic acid or DTPA), carboxylic acids, hydroxycarboxylic acids, hydrophilic polypyridines, dithiophosphonic acids, amines, polyazines grafted with $C_1$-$C_8$ alkyl chains, hydroxyoximes, sulfonic acids, hydroxamic acids and β-diketones.

Moreover, it is also possible to add to the strongly acidic aqueous phase at least one reducing agent capable of reducing neptunium (V) to neptunium (IV) and of stabilizing it in this form, so as to make it more readily extractable by the organic phase. As reducing agents that may be used, mention may be made especially of hydrazine derivatives, hydroxylamine derivatives and ferrous sulfamate.

As indicated previously, step b) of the process is performed using a weakly acidic aqueous phase in which is present at least one complexing agent, which may be chosen from all the complexing agents mentioned previously. Thus, it may especially be an aminopolyacetic acid such as HEDTA or DTPA, which is used in combination with an acid capable of acting as a buffer at a pH from 1 to 5, for example a hydroxy-carboxylic acid such as glycolic acid or citric acid, and a base of the type such as sodium hydroxide, hydrazine, amine or carbonate, such that the said aqueous phase has a pH ranging from 1.5 to 4.5 and better still from 2.5 to 3.5.

This weakly acidic aqueous phase may moreover comprise at least one reducing agent, also for the purpose of reducing the neptunium (VI) and of facilitating its back-extraction if a reducing agent has not already been used in step a).

In this case, the reducing agent is advantageously chosen from hydrazine derivatives, hydroxylamine derivatives, oxime derivatives and hydroxyurea.

When the organic phase is intended to be reused, especially for performing a new grouped separation of actinides, the process then also comprises a step that consists in back-extracting the lanthanides and yttrium from the organic phase, which is performed after step b).

To do this, the organic phase is brought into contact with an acidic aqueous phase, which is preferably free of any complexing agent, for instance a dilute nitric acid solution, for example with a molarity ranging from 0.1 to 1, or, on the contrary, a concentrated nitric acid solution, i.e. with a molarity of greater than or equal to 4.

It is, however, also possible to use a (weakly or strongly) acidic aqueous solution containing a complexing agent such as a polyaminocarboxylic acid, a phosphorus-based acid, a sulfonic acid or a hydrophilic polyazine.

If fission products other than lanthanides and yttrium have also been extracted from the strongly acidic aqueous phase in step a), the process then also comprises one or more steps that consist in back-extracting these fission products.

Thus, for example, when a malonamide is used as first extractant, and a phosphorus-based acid as second extractant, it turns out that molybdenum and zirconium are coextracted together with the actinides, the lanthanides and yttrium, such that the process comprises:

between step a) and step b), a step that consists in selectively back-extracting the molybdenum from the organic phase; and after the step of back-extracting the lanthanides and yttrium, a step that consists in back-extracting zirconium from this same organic phase.

These back-extractions, which may also make it possible to free the organic phase of cations that are not fission products, for instance iron or chromium, but that have been extracted from the organic strongly acidic aqueous phase during step a), are advantageously performed using a weakly acidic aqueous phase containing at least one compound capable of selectively complexing the element(s) that it is desired to back-extract at the pH presented by this aqueous phase.

When the organic phase is intended to be reused, the process according to the invention comprises, as the final stage, a step of purification of the organic phase that is intended to remove therefrom the impurities and the degradation products that have accumulated during the preceding steps.

This purification step may comprise, as already described in the prior art, one or more operations for washing the organic phase with aqueous phases containing compounds capable of selectively complexing the impurities and the degradation products it contains, and thus of allowing their transfer into these phases without, however, back-extracting the first and second extractants, and one or more filtration operations if the organic phase contains a precipitate.

A subject of the invention is also a process for reprocessing an irradiated nuclear fuel, which comprises the use of a process for the grouped separation of the actinides (III), (IV), (V) and (VI) as defined previously, and its use for recovering the plutonium, neptunium, americium, curium and possibly the uranium, in a grouped manner but selectively with respect to the fission products, from a solution for dissolution of an irradiated nuclear fuel, downstream of a uranium extraction cycle.

The invention will be understood more clearly on reading the examples that follow, which refer to the attached FIGURE.

It goes without saying that these examples are given merely as illustrations of the subject of the invention and should not in any way be interpreted as a limitation of this subject.

BRIEF DESCRIPTION OF THE FIGURE

FIG. 1 is a flow diagram of an example of implementation of the process of the invention.

In this FIGURE, the reference rectangles 1, 2, 3, 4 and 5 schematically represent extractors of the type conventionally used in the reprocessing of irradiated nuclear fuels, for instance multiple mixing-decanting extractors. The streams of solvent phase entering and leaving these extractors are symbolized by a double line, whereas the streams of aqueous phase entering and leaving these extractors are symbolized by a single line.

DETAILED DESCRIPTION OF THE INVENTION

Example 1

Detailed Description of an Embodiment of the Invention

Reference is made to FIG. 1, which schematically illustrates an example of implementation of the process of the invention, designed for the grouped separation of plutonium, neptunium, americium, curium and uranium, possibly present in trace amount, from the fission products from a solution for dissolution of an irradiated nuclear fuel, after extraction of the uranium it contains.

This solution is a strongly acidic aqueous solution, for example a 2 to 5 M nitric acid solution, which contains actinides, lanthanides (lanthanum, cerium, praseodymium, neodymium, samarium, europium, etc.), fission products that are not lanthanides, for instance yttrium, molybdenum, zirconium, rubidium, ruthenium, rhodium, palladium, strontium and rhodium, and cations that are not fission products, for instance iron and chromium.

In this implementation example, the first and second extractants are, respectively:
 a malonamide such as N,N'-dimethyl-N,N'-dibutyltetradecylmalonamide (DMDBTDMA) or N,N'dimethyl-N,N'-dioctylhexylethoxymalonamide (DMDOHEMA), which is used at a concentration, for example, of from 0.5 to 0.6 mol/L, and
 an acidic phosphorus-based extractant of the type such as a monoalkyl- or dialkyl-phosphoric acid, for instance bis (2-ethylhexyl)phosphoric acid (HDEHP), or of the type such as a monoalkyl- or dialkyl-phosphonic acid, for instance 2-ethylhexyl-2-ethylhexyl-phosphonic acid (HEHEHP), which is used at a concentration, for example, of from 0.3 to 0.6 mol/L.

Thus, the process comprises the following steps:
 a coextraction step for extracting from the strongly acidic aqueous solution the actinides together with the lanthanides, yttrium, molybdenum, zirconium and iron, with the organic phase;
 a step of selective back-extraction of the molybdenum from the organic phase;
 a step of selective back-extraction of the actinides from the organic phase;
 a step of back-extraction of the lanthanides and the yttrium from the organic phase;
 a step of back-extraction of the zirconium from this same organic phase, this back-extraction also allowing the back-extraction of the iron; and
 a step of purification of the organic phase.

In the first step (coextraction), the strongly acidic aqueous solution, named "CHARGE" in FIG. 1, is brought into contact, counter-currentwise, with a water-immiscible organic phase, which contains the two abovementioned extractants in an organic diluent, advantageously hydrogenated tetrapropylene.

This strongly acidic aqueous solution may optionally be supplemented with one or more complexing agents capable of preventing, or at the very least limiting, the coextraction of certain fission products (for example palladium) or of other undesirable cations, and also one or more reducing agents capable of reducing neptunium (V) to neptunium (IV) and of stabilizing it in this form.

The complexing agent(s) may be chosen especially from pyridinepolycarboxylic acids, for instance 2,6-pyridinedicarboxylic acid, which is used at a concentration, for example, of 0.3 mol/L, and polyaminocarboxylic acids, for instance N-(2-hydroxyethyl)ethylenediaminetriacetic acid (HEDTA) or diethylenetriaminepentaacetic acid (DTPA), which is used at a concentration, for example, of 0.01 mol/L. However, they may also be chosen from the carboxylic acids, hydroxycarboxylic acids, amines, polyazines, hydroxyoximes, sulfonic acids, hydroxamic acids and β-diketones.

The reducing agent(s) may be chosen from hydrazine nitrates, hydroxylamine nitrates and ferrous sulfamate.

The first step also comprises operations for washing the organic phase, which may be performed, as is well known in the prior art, by bringing this organic phase into contact with various acidic aqueous solutions, for instance a first solution of nitric acid at 2.8 mol/L and of HEDTA at 0.015 mol/L, and second solution of nitric acid at 0.5 mol/L.

This first step first produces, on the one hand, an aqueous phase that contains the fission products (FPs) that are not extractable by the organic phase, and, on the other hand, an organic phase in which is present the plutonium, neptunium, americium, curium, the possible traces of uranium, and the lanthanides, yttrium, molybdenum, zirconium and iron.

In the second step (selective back-extraction of molybdenum), the organic phase is brought into, counter-currentwise, with a weakly acidic aqueous solution containing one or more compounds capable of selectively complexing molybdenum at a pH of greater than or equal to 1. Such a solution is, for example, a citric acid solution at 0.5 mol/l neutralized to a pH of about 3 with a base such as sodium hydroxide.

This second step thus produces an aqueous phase charged with molybdenum and an organic phase freed of this element.

In the third step (selective back-extraction of the actinides), the organic phase is brought into contact, counter-currentwise, with a weakly acidic aqueous solution containing one or more compounds capable of selectively complexing the actinides at a pH greater than or equal to 1. Such a solution is, for example, a solution of citric acid at 0.5 mol/L and of diethylenetriaminepentaacetic acid (DTPA) at 0.01 mol/L, of pH 3.

Selective back-extraction of the actinides is made possible by the action of the complexing agent present in the weakly acidic aqueous solution, but also by that of the acidic extractant present in the organic phase that allows retention of the lanthanides and other elements in this organic phase.

This third step thus produces an aqueous phase containing plutonium, neptunium, americium, curium and the possible traces of uranium, and an organic phase freed of these elements.

In the fourth step (back-extraction of the lanthanides and the yttrium), the organic phase is brought into contact, counter-currentwise, with an acidic aqueous solution whose acidity is within a pH range in which the extracting power of the organic phase is minimal with respect to the lanthanides and yttrium. Such a solution is, for example, a nitric acid solution at 0.5-1 mol/L.

This fourth step thus produces an aqueous phase charged with lanthanides and yttrium, and an organic phase freed of these elements.

In the fifth step (back-extraction of the zirconium and iron), the organic phase is brought into contact, counter-currentwise, with a weakly acidic aqueous solution containing one or more agents capable of selectively complexing zirconium and iron at a pH above 0. Such a solution is, for example, a 1 M nitric acid and 0.8 M oxalic acid solution, of pH 0.

Finally, in the sixth step, organic phase is purified, for example by washing one or more times with an aqueous solution of a strong base, with a pH of greater than or equal to 8, for instance a sodium carbonate or sodium hydroxide solution (0.1-0.3 mol/L) and, additionally, by one or more filtrations when it contains a precipitate.

The organic phase thus purified may be reused for performing a subsequent cycle.

Example 2

Experimental Confirmation

1) Coextraction:

This step was confirmed experimentally using:

an organic phase containing 0.6 mol/L of DMDOHEMA as solvating extractant, and 0.3 mol/L of HDEHP as acidic extractant, in HTP; and four aqueous phases constituted of aqueous 3 M nitric solutions (which corresponds to the typical acidity of a solution for dissolution of an irradiated nuclear fuel) and containing, for the first: uranium (VI), for the second: neptunium (VI), for the third: neptunium (V) and plutonium (IV), and for the fourth: neptunium (IV), plutonium (III), americium (III) and curium (III) as actinides, and cerium (III) and europium (III) as lanthanides.

All these elements were present in the aqueous phases in trace amounts, i.e. at concentrations of the order of $10^{-5}$-$10^{-6}$ mol/L, with the exception of neptunium and uranium, which were themselves present at concentrations, respectively, of $1.5 \times 10^{-3}$ mol/L and $10^{-2}$ mol/L.

The organic phase, acid-equilibrated beforehand with 3 M nitric acid, was brought into contact with each of the aqueous phases under strictly the same conditions, namely: 1 volume of organic phase per 1 volume of aqueous phase, with stirring for 1 hour at 25° C.

After decantation and separation of the organic and aqueous phases, the activities or the concentrations of the various elements were measured in the two phases, organic and aqueous, in order to determine their distribution coefficients $D_M$.

The distribution coefficient $D_M$ of an element M corresponds to the ratio between the activity or concentration of this element in the organic phase and the activity or concentration of this same element in the aqueous phase.

The activities of plutonium, neptunium and curium were measured by $\alpha$ spectrometry.

The activities of americium, cerium and europium were measured by $\gamma$ spectrometry, whereas the uranium concentrations were determined by fluorescence.

Table I below presents the distribution coefficients $D_M$ as obtained for the various elements initially present in the aqueous phases.

TABLE I

| Elements | $D_M$ |
| --- | --- |
| $^{238}$U(VI) | 850 |
| $^{237}$Np(VI) | 39 |
| $^{237}$Np(V) | 7 |
| $^{237}$Np(IV) | 560 |
| $^{239}$Pu(IV) | 2000 |
| $^{239}$Pu(III) | 1150 |
| $^{241}$Am(III) | 9 |
| $^{244}$Cm(III) | 5 |
| $^{139}$Ce(III) | 8 |
| $^{152}$Eu(III) | 5.5 |

This table shows that all the actinides and lanthanides initially present in the aqueous phases have a distribution coefficient of greater than or equal to 5, which means that they were indeed extracted by the DMDOHEMA/HDEHP mixture into the organic phase.

In particular, uranium (VI), neptunium (IV) and plutonium (III and IV) were very strongly extracted by this mixture.

Neptunium (V), which is generally very sparingly extracted by the majority of solvating extractants, has a distribution coefficient here of greater than 7 after 1 hour of stirring. A spectrophotometric study made it possible to show that Np (V) dismutates and is extracted in the form of Np (IV) and Np (VI) by the DMDOHEMA/HDEHP mixture.

Moreover, it was also found that an increase in the nitric acid content of the aqueous phase, from 3 to 3.8 mol/L, has a very favourable effect on the extraction of Np (V) since its distribution coefficient then rises from 7 to 32. Thus, by increasing the contact time between the organic and aqueous phases and/or the acidity of the aqueous phase, it is possible to obtain very efficient extraction of neptunium (V) by the organic phase without adding reducing agents or oxidizing agents to the aqueous phase.

The charge capacity of the DMDOHEMA/HDEHP mixture, at 0.60 mol/L and 0.3 mol/L, respectively, in HTP, was also evaluated in this step, in the case of cerium. To do this, the organic phase was brought into contact several times with an aqueous phase constituted of a 3 M nitric acid solution containing 0.14 mol/L of cerium, varying the ratio between the volumes of the aqueous phase and of the organic phase from 1 to 4. No demixing was observed even for amounts of cerium present in the organic phase of 0.11 mol/L.

It results therefrom that the charge capacity of the DMDOHEMA/HDEHP mixture, at 0.6 mol/L and 0.3 mol/L in HTP, respectively, and for a nitric acid content of the aqueous phase of 3 mol/L, is sufficient to tolerate the concentrations of actinides and lanthanides present in the solutions for dissolution of the future nuclear fuels.

The demixing limit with respect to the acidity of the aqueous phase was also evaluated by using an organic phase containing 0.5 mol/L of DMDOHEMA and 0.3 mol/L of HDEHP in HTP. This experiment made it possible to show that HDEHP makes it possible to push back the demixing limit greatly in the presence of high concentrations of $HNO_3$ of the aqueous phase, since this demixing takes place for $HNO_3$ concentrations of greater than 7.5 M (corresponding to $HNO_3$ concentrations of greater than 1.4 M in the organic phase), whereas, under the same conditions, DMDOHEMA alone, at 0.5 mol/L in HTP, cannot tolerate an $HNO_3$ concentration of the aqueous phase of greater than 5.3 M (i.e. an $HNO_3$ concentration of the organic phase of 0.66 M).

The acidic extractant, represented herein by HDEHP, thus has phase-modifying properties in the actinide and lanthanide coextraction step, which is performed at high nitric acidity and in which the predominant extractant is the solvating extractant, represented by DMDOHEMA.

These properties are very advantageous since they make it possible to perform the extraction of all the actinides using very strongly acidic aqueous solutions, in order to increase their distribution coefficients, especially that of neptunium, and, consequently, to reduce the ratio between the flow rates of organic and aqueous phase, thus limiting the organic inventory used.

2) Back-Extraction of Molybdenum:

This step was confirmed experimentally using:

two organic phases containing 0.6 mol/L of DMDOHEMA and 0.3 mol/L of HDEHP in HTP and containing, for the first: molybdenum (VI) and lanthanides coextracted from an aqueous phase as described in point 1) of the present example, and for the second: plutonium (IV), americium (III), cerium (III) and europium (III) coextracted from an aqueous phase as described in point 1) of the present example; and an aqueous phase constituted by a 0.5 mol/L citric acid solution neutralized to pH 3 with sodium hydroxide.

The aqueous phase was brought into contact with each of the organic phases under strictly the same conditions, namely: 5 volumes of aqueous phase per 1 volume of organic phase, with stirring for 15 minutes at 25° C.

After decantation and separation of the organic and aqueous phases, the activities or concentrations of the various elements were measured in the two phases, organic and aqueous, in order to determine their distribution coefficients $D_M$.

As previously, the plutonium activities were measured by α spectrometry, the americium, europium and cerium activities were measured by γ spectrometry, while the molybdenum concentrations were measured by ICP-AES.

Table II below presents the distribution coefficients $D_M$ as obtained for the various elements.

TABLE II

| Elements | $D_M$ |
|---|---|
| Mo(VI) | 0.05 |
| $^{239}$Pu(IV) | 32 |
| $^{241}$Am(III) | 21 |
| $^{139}$Ce(III) | 70 |
| $^{152}$Eu(III) | 135 |

This table shows that molybdenum was indeed back-extracted from the organic phase with very good selectivity with respect to the actinides and lanthanides.

The charge capacity of the DMDOHEMA/HDEHP mixture was also determined in this step, in the case of cerium. To do this, an organic phase containing 0.6 mol/l of DMDOHEMA and 0.3 mol/L of HDEHP in HTP, and also 0.11 mol/L of cerium extracted at an acidity of the aqueous phase of 3 mol/L, was brought into contact with an aqueous phase constituted by a 0.5 M citric acid solution, of pH 3 and containing 0.45 mol/L of tetraethylammonium hydroxide in order to neutralize the organic nitric acidity which tends to become back-extracted in this step. No demixing was observed.

The amount of cerium extracted by the organic phase exceeded 0.06 mol/L, i.e. a value sufficient to extract the actinides and lanthanides (the molybdenum passing into the aqueous phase). The charge capacity of the DMDOHEMA/HDEHP mixture, at 0.6 mol/L and 0.3 mol/L in HTP, respectively, in the molybdenum back-extraction step, appears to be sufficient to treat the solutions for dissolution of the nuclear fuels intended to be used in the future.

3) Selective Back-Extraction of the Actinides:

This step was confirmed experimentally using:

two organic phases containing 0.6 mol/L of DMDOHEMA and 0.3 mol/L of HDEHP in HTP and containing, for the first: neptunium (V) and plutonium (IV) coextracted from an aqueous phase as described in point 1) of the present example, and, for the second: neptunium (IV), plutonium (III), americium (III), curium (III), cerium (III) and europium (III) co-extracted from an aqueous phase as described in point 1) of the present example; and a complexing aqueous phase of pH 3 containing 0.5 mol/L of citric acid neutralized with sodium hydroxide and 0.01 mol/L of DTPA.

This aqueous phase was brought into contact with each of the organic phases under strictly the same conditions, namely: 1 volume of aqueous phase per 1 volume of organic phase, with stirring for 1 hour at 25° C.

After decantation and separation of the organic and aqueous phases, the activities or concentrations of the various elements were measured in the two phases, organic and aqueous, in order to determine their distribution coefficients $D_M$ and then the separation factors $SF_{Eu/Am}$ and $SF_{Ce/Am}$.

The separation factor between two elements M1 and M2, noted $SF_{M1/M2}$, is defined as being the ratio between the distribution coefficients, $D_{M1}$ and $D_{M2}$, respectively, of these two elements. The separation between the two elements M1 and M2 is considered as being satisfactory when the separation factor $SF_{M1/M2}$ is greater than 10.

As previously, the activities of plutonium, neptunium and curium were measured by α spectrometry, whereas those of americium, europium and cerium were measured by γ spectrometry.

Table III below presents the distribution coefficients $D_M$ as obtained for the various elements, and also the separation factors $SF_{Eu/Am}$ and $SF_{Ce/Am}$.

TABLE III

| Elements | $D_M$ | $SF_{Eu/An}$ | $SF_{Ce/An}$ |
|---|---|---|---|
| $^{237}$Np(V) | 0.04 | 100 | 525 |
| $^{237}$Np(IV) | <0.01 | >400 | >2000 |
| $^{239}$Pu(IV) | 0.01 | 400 | 2000 |
| $^{239}$Pu(III) | <0.01 | >400 | >2000 |
| $^{241}$Am(III) | 0.3 | 13 | 68 |
| $^{244}$Cm(III) | 0.2 | 21 | 110 |
| $^{139}$Ce(III) | 21 | — | 1 |
| $^{152}$Eu(III) | 4 | 1 | — |

This table shows that all the actinides were indeed back-extracted from the organic phase with very good selectivity with respect to the lanthanides.

4) Back-Extraction of the Lanthanides and of Yttrium:

The lanthanides and yttrium may be quantitatively back-extracted from the organic phase by bringing into contact with an aqueous phase constituted by a nitric acid solution at 0.5-1 mol/L, the acidity range in which the extracting power of the DMDOHEMA/HDEHP mixture is minimal with respect to these elements.

Under these conditions, the distribution coefficients of the lanthanides and of yttrium are close to 1, which is sufficient to back-extract these elements with a ratio between the flow rates of the aqueous and organic phases of greater than 2.

Cited Reference

[1] BARON P. et al., *Proceedings of the International Conference on Back-End of the Fuel Cycle: From Research to Solutions GLOBAL'01*, Paris, France, 9-13 Sep. 2001, INIS-FR-1108

The invention claimed is:

1. A process for separating plutonium, neptunium, americium and curium in a grouped manner from a first acidic aqueous phase, the first acidic aqueous phase comprising 2 to 5 moles/L of nitric acid, the plutonium, the neptunium, the americium, the curium and fission products including lanthanides and yttrium, the process comprising:
   (a) co-extracting at least the plutonium, the neptunium, the americium, the curium, the lanthanides, and the yttrium from the first acidic aqueous phase, by:
      bringing the first acidic aqueous phase into contact with an immiscible organic phase, the organic phase comprising a first extractant and a second extractant, the first extractant being an extractant capable of extracting the plutonium, the neptunium, the americium, the curium, the lanthanides, and the yttrium from the first acidic aqueous phase, and the second extractant being a dialkylphosphorous-based acid capable of extracting the plutonium, the neptunium, the americium, the curium, the lanthanides, and the yttrium from a second acidic aqueous phase having a pH of 3; and
      separating the first acidic aqueous acidic phase from the organic phase; and
   (b) stripping the plutonium, the neptunium, the americium, the curium from the organic phase resulting from (a) without stripping the lanthanides and the yttrium, by:
      bringing the organic phase into contact with the second acidic aqueous phase having a pH of 3, the second acidic aqueous phase comprising an aminopolyacetic acid for complexing the plutonium, the neptunium, the americium, the curium, a hydroxycarboxylic acid, a base and at least one reducing agent selected from the group consisting of a hydrazine, a hydroxylamine, an oxime and a hydroxyurea; and
      separating the organic phase from the second acidic aqueous phase, thereby separating the plutonium, the neptunium, the americium, the curium from the lanthanides and the yttrium;
   wherein
   the first extractant is N,N'-dimethyl-N,N'-dioctylhexylethoxymalonamide (DMDOHEMA), and
   the second extractant is 2-ethylhexyl-2-ethylhexylphosphonic acid (HDEHP).

2. The process according to claim 1, wherein the first acidic aqueous phase further comprises at least one complexing agent.

3. The process according to claim 2, wherein the complexing agent is selected from the group consisting of pyridine-polycarboxylic acids, aminopolycarboxylic acids, carboxylic acids, hydroxycarboxylic acids, hydrophilic polypyridines, dithiophosphonic acids, amines, polyazines grafted with $C_1$-$C_8$ alkyl chains, hydroxyoximes, sulfonic acids, hydroxamic acids and β-diketones.

4. The process according to claim 1, wherein the first acidic aqueous phase further comprises at least one reducing agent.

5. The process according to claim 4, wherein the reducing agent is selected from the group consisting of hydrazine derivatives, hydroxylamine derivatives and ferrous sulfamate.

6. The process according to claim 1, wherein:
   the aminopolyacetic acid is N-(2-hydroxyethyl)ethylenediaminetriacetic acid or diethylenetriaminepentaacetic acid; and
   the hydroxycarboxylic acid is glycolic acid or citric acid.

7. The process according to claim 1, further comprising stripping the lanthanides and the yttrium from the organic phase resulting from (b), by:
   bringing the organic phase into contact with a third acidic aqueous phase having a molarity of from 0.1 to 1 or greater than or equal to 4; and
   separating the organic phase from the third acidic aqueous phase.

8. The process according to claim 1, wherein:
   (a) comprises co-extracting molybdenum, along with the plutonium, the neptunium, the americium, the curium, the lanthanides, and the yttrium, from the first acidic aqueous phase; and
   the process further comprises, after (a) and before (b), stripping the molybdenum from the organic phase resulting from (a) without stripping the plutonium, the neptunium, the americium, the curium, the lanthanides, and the yttrium.

9. The process according to claim 1, wherein:
   (a) comprises co-extracting zirconium, along with the plutonium, the neptunium, the americium, the curium, the lanthanides, and the yttrium, from the first acidic aqueous phase; and
   the process further comprises, after (b), stripping the zirconium from the organic phase resulting from (b).

10. The process according to claim 1, further comprising purifying the immiscible organic phase resulting from (b).

11. A process for reprocessing an irradiated nuclear fuel, comprising the process according to claim 1.

12. The process according to claim 11, wherein reprocessing the irradiated nuclear fuel comprises recovering plutonium, neptunium, americium and curium, in a grouped manner but selectively with respect to the fission products, from a solution for dissolution of an irradiated nuclear fuel, downstream of a uranium extraction cycle.

* * * * *